United States Patent [19]

Taniguchi et al.

[11] Patent Number: 5,093,679
[45] Date of Patent: Mar. 3, 1992

[54] CAMERA CAPABLE OF BEING REMOTE-CONTROLLED

[75] Inventors: Hidenori Taniguchi; Hiroshi Arita; Kazuyuki Maeda, all of Kanagawa, Japan

[73] Assignee: Canon Kabushiki Kaisha, Tokyo, Japan

[21] Appl. No.: 513,060

[22] Filed: Apr. 20, 1990

Related U.S. Application Data

[63] Continuation of Ser. No. 397,666, Aug. 23, 1989, abandoned.

Foreign Application Priority Data

Sep. 6, 1988 [JP] Japan .................. 63-223909
Sep. 6, 1988 [JP] Japan .................. 63-223910

[51] Int. Cl.$^5$ .................. G03B 13/36; G03B 17/38
[52] U.S. Cl. ................................ 354/400; 354/266
[58] Field of Search ........................ 354/400, 266

[56] References Cited

U.S. PATENT DOCUMENTS 4,669,849 6/1987 Ohtsuka et al. .................. 354/400
4,864,340 9/1989 Kaneko .................. 354/266

Primary Examiner—W. B. Perkey
Attorney, Agent, or Firm—Robin, Blecker, Daley & Driscoll

[57] ABSTRACT

This invention discloses a camera capable of being remote-controlled by a remote control signal, comprising a memory for storing a distance information in response to the operation of an operating member, and a control circuit for permitting the memory to hold the distance information stored in the memory in response to the setting to enable remote control by the remote control signal even after the operation of the operating member was cancelled.

70 Claims, 3 Drawing Sheets

CAMERA CAPABLE OF BEING REMOTE-CONTROLLED

This application is a continuation, of application Ser. No. 397,666, filed Aug. 23, 1989, abandoned.

BACKGROUND OF THE INVENTION

1. Field of the Invention

This invention relates to a camera capable of being remote-controlled by a remote control signal.

2. Description of the Related Art

Any conventional type camera with autofocusing means has been designed to measure a distance at the first stroke of its release member and drive its lenses into their in-focus positions at the second stroke of the release member so as to perform an exposure operation. Such a camera measures a distance only through a certain distance measuring zone on its finder. Therefore, it cannot measure the distance to an object which is viewed out of the distance measuring zone. To solve this problem, the camera is designed to maintain the release member at their first stroke position so that the distance data measured through the distance measuring zone can be stored in a memory. Particularly, a photographer fits an object within the distance measuring zone on the finder of a camera and presses the release member of the camera to the first stroke position, so that the camera measures the distance to the object. Then, he recomposes a picture to be taken and presses the release member set by hand at the first stroke position further to the second stroke position, while the measured distance data of the object is stored in a memory of the camera. By doing so, he can photograph the object in focus, even if the object is viewed out of the distance measuring zone.

If the camera is remote-controlled by a remote controller, however, it presents the inconvenience that a photographer cannot maintain the release member of the camera at the first stroke position nor take the picture of an object in his optional composition by using the measured distance data of the object stored in the memory of the camera, because he cannot touch the release member directly.

Such a camera capable of being remote-controlled by remote control signals, especially a small camera which can be charged only with a small battery, presents the great inconvenience that if a switch to operate a remote control signal receiving circuit is inadvertently left in its on position, the power will continue to be wastefully supplied to the receiving circuit.

SUMMARY OF THE INVENTION

In view of these inconveniences, the first object of this invention is to provide a camera capable of being remote-controlled by a remote control signal, which comprises memory means for storing a distance information in response to the operation of an operating member, and control means for permitting the memory means to hold the distance information stored in the memory means in response to the setting to enable the remote control by the remote control signal also after the operation of the operating member was released, so that the pre-stored distance information can be used for the remote control by the remote control signal.

The second object of this invention is to provide the above-described camera capable of being remote-controlled by a remote control signal, which further comprises releasing means for clearing the memory means in response to the setting to disable the remote control by the remote control signal, so as to prevent the camera from keeping the distance information stored in the memory means and taking pictures out of focus also after the remote control was disabled.

The third object of this invention is to provide the above-described camera capable of being remote-controlled by a remote control signal, which further comprises renewal means for renewing the distance information stored in the memory means in response to the re-operation of the operating member, so that the distance to an object can be easily re-measured.

The fourth object of this invention is to provide a camera capable of being remote-controlled by a remote control signal, which comprises means for receiving the remote control signal, operating means for actuating the remote-control signal receiving means, and halting means for stopping the receiving means from being actuated by the operating means for a certain period of time when the receiving means receives no remote control signal, so that the battery of the camera will not be wastefully consumed.

These and other objects and features of this invention will be better understood by reading the description of the preferred embodiments as given below.

DETAILED DESCRIPTION OF THE PREFERRED EMBODIMENTS

The preferred embodiments of this invention will be described below in reference to the drawings annexed hereto.

Figure 1:
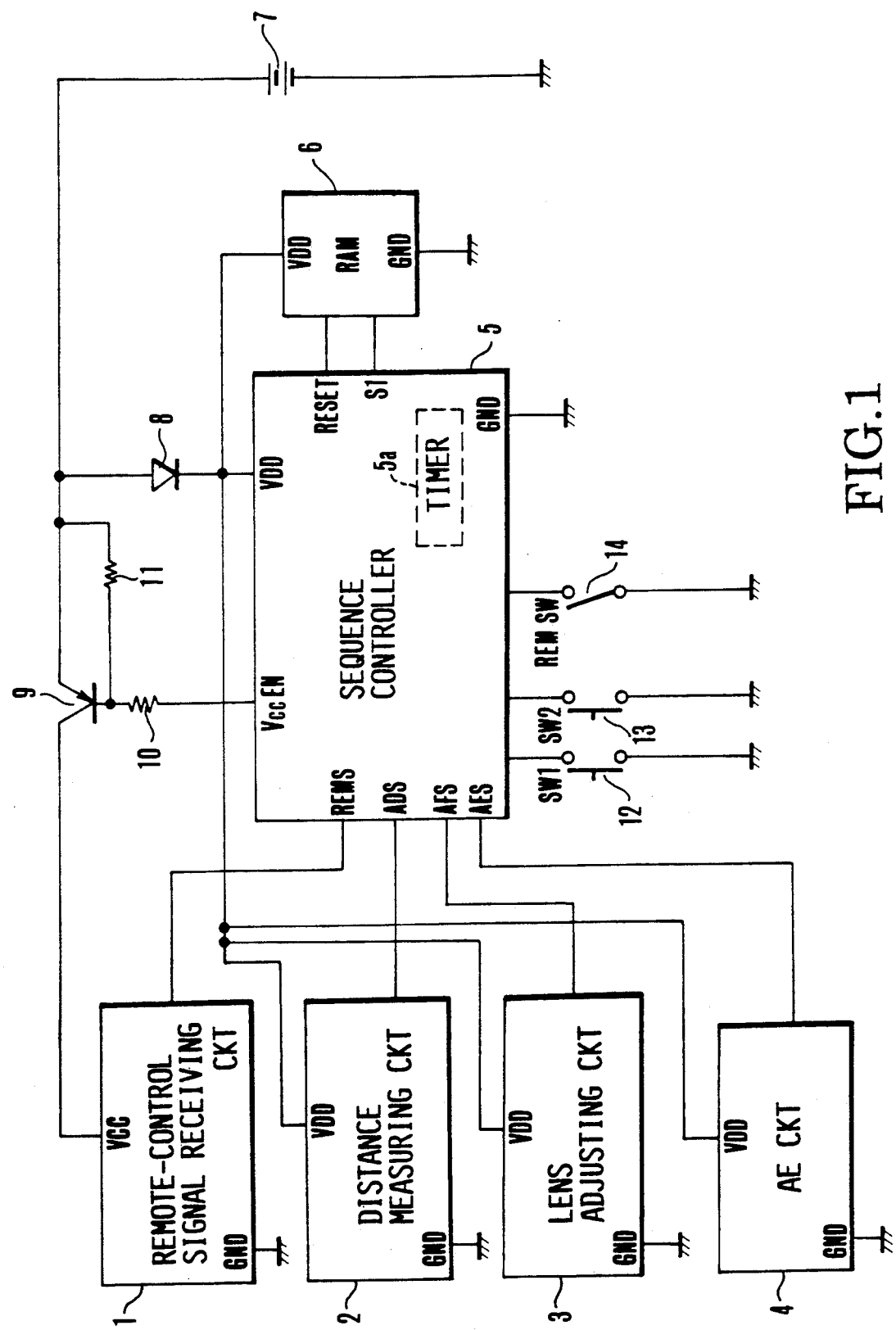
FIG. 1 is a block diagram showing the circuit of a camera capable of being remote-controlled, as an embodiment of this invention.

FIG. 1 is a block diagram showing the circuit configuration of a camera according to this invention. In this figure, a publicly known remote-control signal receiving circuit 1 receives a release signal for starting the exposure as a remote control signal from a remote-control signal transmitter (not shown) detachably mounted on a camera body. A publicly known distance measuring circuit 2 determines an object distance to be used for the autofocusing operation. A publicly known lens adjusting circuit 3 controls a photographic lens in its in-focus position according to the data provided by the distance measuring circuit 2. A publicly known AE circuit 4 is used for the exposure operation of the camera. A sequence controller 5 comprises a microcomputer to control the operations of the camera. A random-access memory 6 (hereinafter referred to as "RAM") stores the measured distance data supplied by the distance measuring circuit 2 to the sequence controller 5. A battery 7 supplies power to the camera. The anode of a diode 8 is connected to the battery 7, while its cathode is connected to the sequence controller 5. This diode 8 supplies power to the power terminals $V_{DD}$ of the distance measuring circuit 2, the lens adjusting circuit 3, the AE circuit 4, the sequence controller 5 and the RAM 6 respectively. The base of a switching transistor 9 is connected to the sequence controller 5 to control the power supplied by the battery 7 to the power terminal $V_{CC}$ of the remote-control signal receiving circuit 1 according to a signal $V_{CC}EN$ coming from the sequence controller 5. A resistor 10 limits the base current of the transistor 9. A resistor 11 pulls up the base of the transistor 9. An SW1 switch 12 is turned on in response to the first stroke pressing operation of a shutter button (not shown) to actuate the distance measuring circuit 2. An SW2 switch 13 is turned on in response to the second stroke pressing operation of the shutter button (not shown) to operate the lens adjusting circuit 3 according to the distance data provided by the distance measuring circuit 2, control the photographic lens in its in-focus position, and actuate the AE circuit 4 in the exposure operation. An REM switch 14 is turned on in response to the detachment operation of the remote-control signal transmitter from the camera body to set the camera into the remote control photographing mode, and turned off in response to the operation of mounting the remote-control signal transmitter on the camera body to reset the camera from the remote control mode into the ordinary photographing mode.

Figure 2:
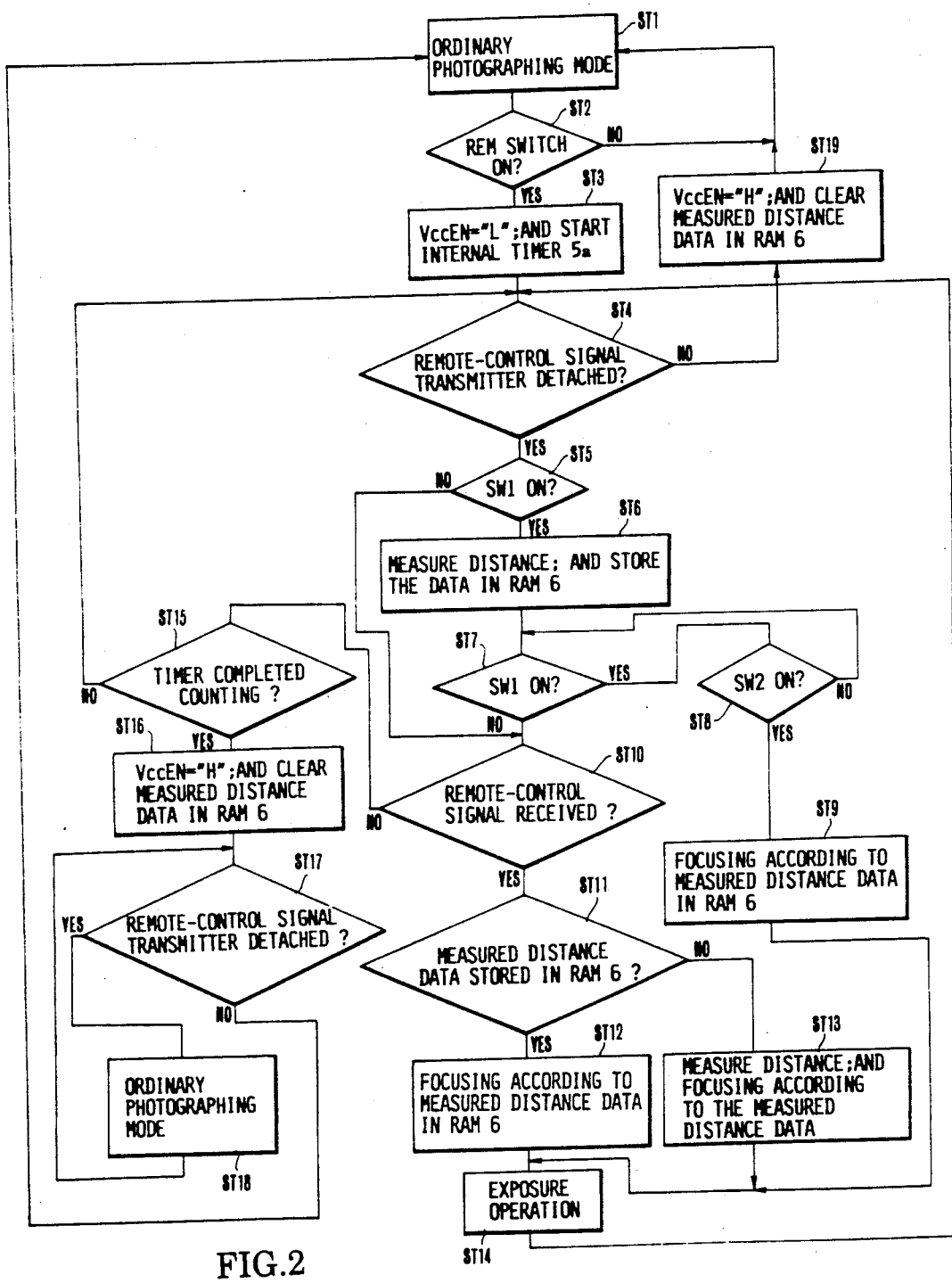
FIG. 2 is a flow chart illustrating the operational sequence of the circuit as shown in FIG. 1.

The operations of the circuit as shown in FIG. 1 will be described below in reference to the flow chart as shown in FIG. 2.

When the remote-control signal transmitter (not shown) is mounted on the camera body, the REM switch 14 is set in OFF. On Step ST2, the sequence controller 5 determines from the OFF state of the REM switch 14 that the camera is not in the remote control photographing mode, but in the ordinary photographing mode. On Step ST1, it controls the camera so as to operate in the ordinary photographing mode. In the ordinary photographing mode, as in the publicly known cameras, the sequence controller 5 detects the first stroke pressing operation of the release button from the ON state of the SW1 switch 12. Then, the distance measuring circuit 2 is operated to measure the object distance, and supplies the measured distance data to the sequence controller 5, which stores then the measured distance data in the RAM 6. The measured distance data is kept stored until the shutter release button is released from its first stroke pressed position to turn off the SW1 switch 12, or until the exposure operation is completed. When the shutter release button is further pressed to the second stroke position after it was pressed to the first stroke position, the SW2 switch 13 is turned on, and the sequence controller 5 operates the lens adjusting circuit 3 according to the measured distance data stored in the RAM 6 so as to set the photographic lens in its in-focus position, and actuates the AE circuit 4 in the exposure operation.

When the remote-control signal transmitter (not shown) is detached from the camera body, the REM switch 14 is turned on, and the sequence controller 5 detects the ON state of the REM switch 14 on Step ST2. Then, the program proceeds to Step ST3, where the ordinary photographing mode is switched over into the remote control photographing mode. On Step ST3, the sequence controller 5 sets the output $V_{CC}EN$ on a level "L" to turn on the switching transistor 9 and supply power from the battery 7 to the remote-control signal receiving circuit 1, which is then enabled to receive remote control signals. At the same time, the sequence controller 5 starts its internal timer 5a in counting.

On Step ST4, the sequence controller 5 determines the state of the REM switch 14 again. If the remote-control signal transmitter is mounted on the camera body with the REM switch 14 set in OFF, the sequence controller 5 sets the output $V_{CC}EN$ on a level "H" on Step ST19 to turn off the switching transistor 9 and cut off the power supply to the remote-control signal receiving circuit 1 so as to disable the receiving circuit 1 from receiving any remote control signal. At the same time, the sequence controller 5 clears the RAM 6 of the measured distance data stored therein, and returns the camera into the ordinary photographing mode on Step ST1. If the REM switch 14 is set in ON on the contrary, the sequence controller 5 determines the state of the SW1 switch 12 on Step ST5. In this case, the sequence controller 5 determines if the release button has been pressed to the first stroke position, after the remote-control signal transmitter was detached from the camera body. If the release button has been pressed to the first stroke position, the sequence controller 5 operates the distance measuring circuit 2 to measure the object distance and stores the measured distance data in the RAM 6 on Step ST6. If any measured distance data has been stored in the RAM 6, it is renewed to the new data.

On Step ST7, the sequence controller 5 determines the state of the SW1 switch 12 again. If the switch 12 is set in ON, the sequence controller 5 determines, on Step ST8, the state of the SW2 switch 13, that is, if the shutter release button has been pressed to the second stroke position. If the SW2 switch 13 is set in OFF, the program returns to Step ST7. If the SW2 switch 13 is set in ON, the sequence controller 5 operates the lens adjusting circuit 3, on Step ST9, to control the focus of the photographic lens according to the measured distance data stored in the RAM 6, and starts the AE circuit 4 in the exposure operation. Then, the program returns to Step ST4.

If it is detected on Step ST5 or ST7 that the SW1 switch 12 is in OFF, the sequence controller 5 determines, on Step ST10, if the remote-control signal receiving circuit 1 has received a remote control signal for starting the exposure operation. If the remote-control signal receiving circuit 1 has received the remote control signal, the sequence controller 5 determines, on Step ST11, if any measured distance data is stored in the RAM 6. If the data is stored in the RAM 6, the sequence controller 5 operates the lens adjusting circuit 3, on Step ST12, to control the photographic lens into focus according to the measured distance data stored in the RAM 6, and starts the AE circuit 4 in the exposure operation on Step ST14. Then, the program returns to Step ST4. If it is detected on Step ST11 that any measured distance data is not stored in the RAM 6, the sequence controller 5 operates, on Step ST13, the distance measuring circuit 2 to measure the object distance, and starts the AE circuit 4 in the exposure operation on Step ST14. Then, the program returns to Step ST4. Particularly, when the shutter release button is pressed to the first stroke position after the remote-control signal transmitter was detached from the camera body, the distance measuring circuit 2 determines the object distance, which is then stored in the RAM 6. If it is detected on Step ST7 that the shutter release button is released from its first stroke position, the RAM 6 is not cleared of the measured distance data stored therein, as in the ordinary photographing mode. When the remote-control signal transmitter delivers a release signal to the remote-control signal receiving circuit 1, the focus of the photographic lens is controlled according to the measured distance data stored in the RAM 6. If the release signal is transmitted from the remote-control signal transmitter to the remote-control signal receiving circuit 1 without any measured distance data being stored in the RAM 6 at the first stroke of the shutter release button after the remote-control signal transmitter was detached from the camera body, then the sequence controller 5 operates the distance measuring circuit 2 to measure the object distance, and controls the focus of the photographic lens according to the measured distance data. If it is detected on Step ST4 after the exposure operation that the REM switch 14 is set in OFF, that is, the remote-control signal transmitter has been mounted on the camera body, the sequence controller 5 turns off the switching transistor 9 to cut off the power supply to the remote-control signal receiving circuit 1, which is then disabled to receive any remote control signal. At the same time, the sequence controller 5 clears the RAM 6 of the measured distance data stored therein, and returns the camera into the ordinary photographing mode on Step ST1.

If the remote-control signal receiving circuit 1 has received no release signal on Step ST10, the sequence controller 5 determines, on Step ST15, if the internal timer 5a which started in counting on Step ST3 has completed the counting of the preset time. If the timer 5a has not yet completed the counting, the program returns to Step ST4. If the timer 5a has completed the counting, the sequence controller 5 sets the output $V_{CC}EN$ on the level "H" on Step ST16 to turn off the switching transistor 9 so as to cut off the power supply to the remote-control signal receiving circuit 1, which is then disabled to receive any remote control signal. At the same time, the sequence controller 5 clears the RAM 6 of the measured distance data stored therein. If it is detected on Step ST4 that the remote-control signal transmitter is mounted on the camera body, after it was detected on Step ST15 that the internal timer 5a had not completed the counting of the preset time, the sequence controller 5 disables the remote-control signal receiving circuit 1 as described above, clears the RAM 6 of the measured distance data stored therein, and returns the camera into the ordinary photographing mode on Step ST1.

On Step ST17 following Steps ST15 and ST16, the sequence controller 5 determines the state of the REM switch 14. If it is detected that the remote-control signal transmitter is mounted on the camera body, the sequence controller 5 returns the program to Step ST1 in the ordinary photographing mode. If it is detected on Step ST17 that the remote-control signal transmitter is not mounted on the camera body, the ordinary photographing mode is selected on Step ST18 in the same manner as when the remote-control signal transmitter is mounted on the camera body. In other words, if the remote control signal is not received for the preset time after the remote-control signal transmitter was detached from the camera body to set the camera in the remote control photographing mode, the camera is also returned into the ordinary photographing mode, in the same manner as when the remote-control signal transmitter is mounted on the camera body.

In the ordinary photographing mode set after the preset time has passed with the remote-control signal transmitter not mounted on the camera body, the remote control photographing mode can be restored by mounting the remote-control signal transmitter on the camera body and detaching it again.

Figure 3:
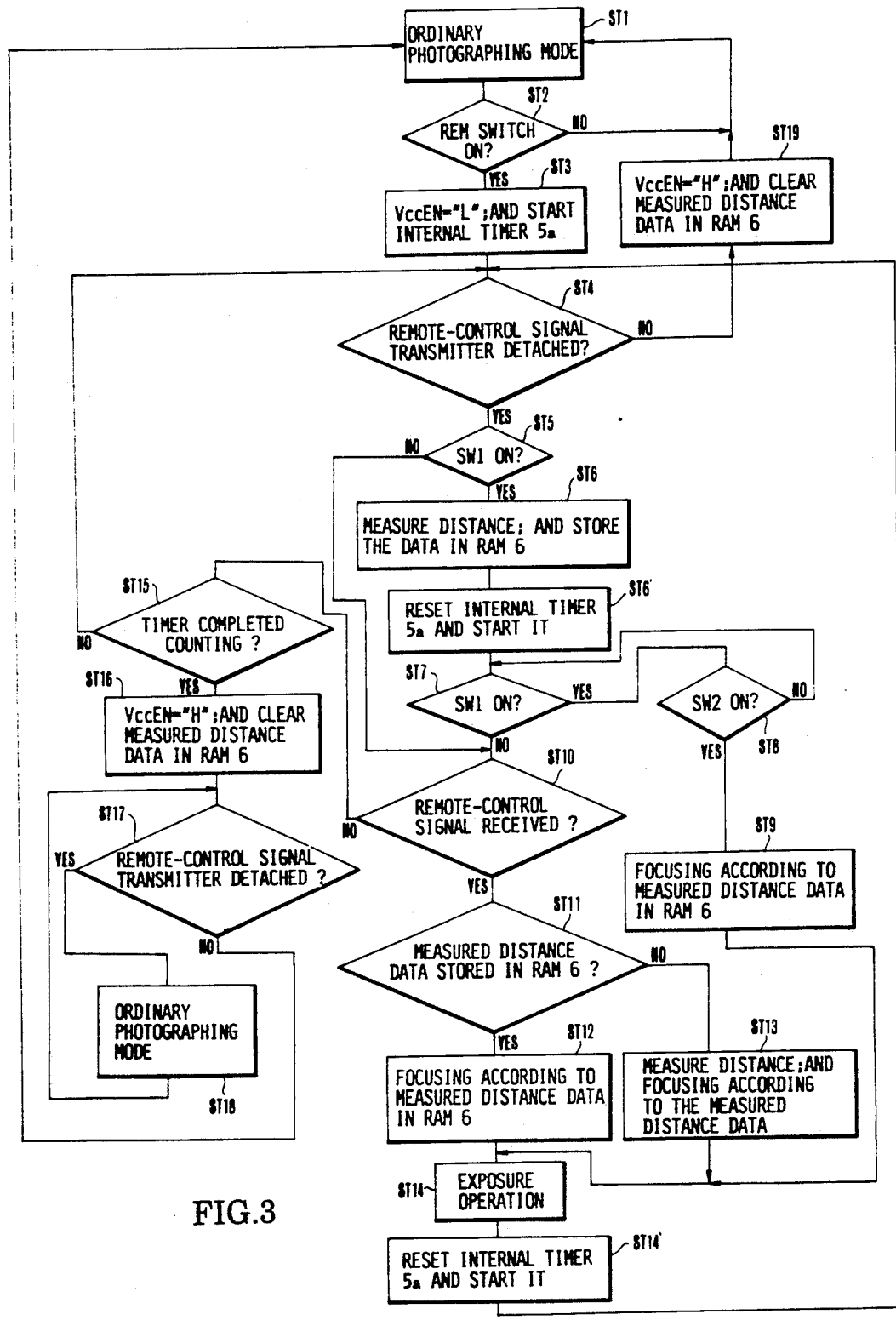
FIG. 3 is a flow chart illustrating the other operational sequence of the circuit as shown in FIG. 1.

FIG. 3 is a flow chart showing another embodiment corresponding to the circuit as shown in FIG. 1. In the flow chart shown in FIG. 2, the timer 5a in the sequence controller 5 starts counting when the remote-control signal transmitter is detached from the camera body. In the flow chart in FIG. 3, however, the timer 5a is reset and started when the SW1 switch is set ON on Step ST6' or when the exposure operation is started on Step ST14', after the remote-control signal transmitter was detached from the camera body. Therefore, the timer 5a completes the counting of the preset time and the remote-control signal receiving circuit 1 is disabled to receive any remote control signal, if the SW1 and SW2 switches 12 and 13 are not set in ON, or if any remote control signal is not received for the preset time. If any of the above-described operations occurs within the preset time, the remote control signal is received.

The other Steps are the same as in the flow chart shown in FIG. 2. Therefore, they are not described here.

In the above-described embodiments, the switch to operate the remote-control signal receiving circuit and select the remote control photographing mode is arranged to be turned on in response to the operation of detaching the remote-control signal transmitter from the camera body. However, it is understood that this signal may be set to ON by any other operating means according to this invention.

In these embodiments, the remote control signal is a start signal for exposure operation. It is also understood that any remote control signal may be used according to this invention.

What is claimed is:

1. A camera capable of being remote-controlled by a remote control signal when said camera is set in a remote control state, comprising:
   (a) memory means for storing distance information in response to an operation of an operating means; and
   (b) control means for permitting said memory means to hold said distance information stored in said memory means in response to the setting of said camera in said remote control state to enable remote control by said remote control signal even after said operating means is released from said operation thereof.

2. A camera according to claim 1, further comprising release means for disabling said control means in response to a setting of said camera in a state other than said remote control state thereof.

3. A camera according to claim 1, further comprising renewal means for renewing said distance information held by said memory means under the control of said control means, in response to a re-operation of said operating means.

4. A camera according to claim 1, further comprising setting means for setting said camera in said remote control state in which remote control by said remote control signal is enabled, said setting means cancelling said remote control state if said remote control signal is not received for a predetermined period.

5. A camera according to claim 1, wherein said operating means includes a shutter release button.

6. A camera according to claim 1, which further comprises means for setting said camera in said remote control state in response to a dismounting of a remote control signal transmitter from the camera.

7. A camera according to claim 1, which further comprises timer means for disabling said control means in response to a lapse of a predetermined time.

8. A camera capable of being remote-controlled by a remote control signal, comprising:
   (A) detection means for detecting data for focus adjustment, and
   (B) holding means for storing and holding the data detected by said detection means in response to said camera being placed in a remote controllable condition.

9. A camera according to claim 8, wherein said detection means includes means for detecting distance data.

10. A camera according to claim 8, which further comprises remote control mode setting means for setting said camera in a remote control mode, whereby said holding means stores and holds the data detected by said detection means in response to the setting of the remote control mode by said remote control mode setting means.

11. A camera according to claim 8, wherein said holding means includes means for storing and holding the data detected by said detection means in response to removal of a remote control signal transmitter from the camera.

12. A camera according to claim 8, which further comprises timer means for releasing the holding means in response to a lapse of a predetermined time.

13. A camera according to claim 8, which further comprises means for releasing the holding means in response to removal of the camera from the remote controllable condition.

14. A camera according to claim 8, which further comprises mode change-over means for changing over the camera from a remote control photographing mode to an ordinary photographing mode, whereby said holding means releases the storing and holding of the data detected by said detection means in response to the change-over from the remote control photographing mode to the ordinary photographing mode by said change-over means.

15. A camera according to claim 8, wherein said holding means includes means for releasing the storing and holding of the data detected by said detection means in response to a mounting of a remote control signal transmitter on the camera.

16. A camera according to claim 8, which further comprises judgment means for judging a condition of the holding means in response to receipt of said remote control signal.

17. A camera according to claim 16, which further comprises means for focus adjustment of a photographing optical system on the basis of data stored and held by said holding means in response to the judgment of said judgment means that said holding means stores and holds data detected by said detection means.

18. A camera according to claim 16, which further comprises means for focus adjustment of a photographing optical system on the basis of data stored and held by said holding means in response to judgment of said judgment means that said holding means does not store and hold data detected by said detection means.

19. A camera according to claim 8, which further comprises means for focus adjustment of a photographing optical system on the basis of data stored and held by said holding means in response to a depression of a shutter button.

20. A camera according to claim 8, which further comprises timer means for releasing an operation of said holding means when said remote control signal is not received for a predetermined time.

21. A camera capable of being remote-controlled by a remote control signal, comprising:
   (A) storing means for storing data for focus adjustment in response to an operation of an operation means; and
   (B) control means for continuing the storing of the data for focus adjustment by said storing means even after the operation of said operation means is released in response to said camera being placed into a remote controllable condition.

22. A camera according to claim 21, wherein said data for focus adjustment stored in said storing means include object distance data.

23. A camera according to claim 21, which further comprises remote control mode setting means for setting said camera in a remote control mode and wherein said control means acts in response to said remote control mode setting means.

24. A camera according to claim 21, wherein said control means includes means for releasing an operation of said control means in response to a lapse of a predetermined time.

25. A camera according to claim 21, which further comprises remote control mode setting means for setting said camera in a remote control mode, wherein said control means acts in response to said remote control mode setting means and wherein said control means includes means for releasing an operation of said control means in response to a lapse of a predetermined time.

26. A camera according to claim 21, wherein said control means includes means for releasing an operation of said control means in response to the camera being taken out of a remote controllable condition.

27. A camera according to claim 21, which further comprises mode change-over means for changing over said camera from a remote-controlled photographing mode to an ordinary photographing mode, and means for releasing an operation of said control means in response to the change-over from the remote-controlled mode by said change-over means.

28. A camera according to claim 21, wherein said control means includes means for releasing an operation of said control means in response to a mounting of a remote control signal transmitter on the camera.

29. A camera according to claim 21, which further comprises judgment means for judging a condition of said storing means in response to receipt of said remote control signal.

30. A camera according to claim 29, which further comprises means for focus adjustment of a photographing optical system on the basis of data stored in said storing means in response to a judgment of said judgment means that the storing means stores data for focus adjustment.

31. A camera according to claim 29, which further comprises detection means for detecting data for the focus adjustment and means for effecting focus adjustment of a photographing optical system on the basis of the data detected by said detection means in response to judgment of said judgment means that said storing means does not store data for focus adjustment.

32. A camera according to claim 21, which further comprises means for effecting focus adjustment of a photographing optical system on the basis of data stored in said storing means when a shutter button is depressed while said control means is operating.

33. A camera according to claim 21, wherein said control means includes means for releasing an operation of said control means if the remote control signal is not received within a predetermined time.

34. A camera according to claim 21, which further comprises renewal means for renewing data stored in said storing means according to the control means in response to a re-operation of the operation means.

35. A camera according to claim 21, wherein said operation means includes a shutter release button.

36. A focus adjustment device capable of being remote-controlled by a remote control signal, comprising:
   (a) memory means for storing distance information in response to an operation of an operating means; and
   (b) control means for permitting said memory means to hold said distance information stored in said memory means in response to the setting to enable remote control by said remote control signal even after said operating means is released from its operation.

37. A focus adjustment device according to claim 36; further comprising release means for releasing an operation of said control means in response to the setting to disable remote control by said remote control signal.

38. A focus adjustment device according to claim 36, further comprising renewal means for renewing said distance information held by said memory means under the control of said control means, in response to a re-operation of said operating means.

39. A focus adjustment device according to claim 36, further comprising setting means for setting said device in said remote control state in which remote control by said remote control signal is enabled, said setting means cancelling said remote control state if said remote control signal is not received for a predetermined period of time.

40. A focus adjustment device according to claim 36, wherein said operating means includes a shutter release button.

41. A focus adjustment device according to claim 36, which further comprises means for setting said camera in said remote control state in response to a dismounting of a remote control signal transmitter from the camera.

42. A focus adjustment device according to claim 36, which further comprises timer means for releasing an operation of said control means in response to a lapse of a predetermined time.

43. A focus adjustment device capable of being remote-controlled by a remote control signal, comprising:
   (A) detection means for detecting data for focus adjustment, and
   (B) holding means for storing and holding the data detected by said detection means in response to said focus adjustment device being placed in a remote controllable condition.

44. A focus adjustment device according to claim 43, wherein said detection means includes means for detecting distance data.

45. A focus adjustment device according to claim 43, which further comprises remote control mode setting means for setting said focus adjustment device in a remote control mode, whereby said holding means stores and holds the data detected by said detection means in response to the setting of the remote control mode by said remote control mode setting means.

46. A focus adjustment device according to claim 43, wherein said holding means includes means for storing and holding the data detected by said detection means in response to removal of a remote control signal transmitter from the focus adjustment device.

47. A focus adjustment device according to claim 43, which further comprises timer means for releasing the holding means in response to a lapse of a predetermined time.

48. A focus adjustment device according to claim 43, which further comprises means for releasing the holding means in response to removal of the focus adjustment device from the remote controllable condition.

49. A focus adjustment device according to claim 43, which further comprises mode change-over means for changing over the focus adjustment device from a remote control mode to an ordinary mode, whereby said holding means releases the storing and holding of the data detected by said detection means in response to the change-over from the remote control mode to the ordinary mode by said change-over means.

50. A focus adjustment device according to claim 43, wherein said holding means includes means for releasing the storing and holding of the data detected by said detection means in response to a mounting of a remote control signal transmitter on the focus adjustment device.

51. A focus adjustment device according to claim 43, which further comprises judgment means for judging a condition of the holding means in response to receipt of said remote control signal.

52. A focus adjustment device according to claim 51, which further comprises means for focus adjustment of an optical system on the basis of data stored and held by said holding means in response to a judgment of said judgment means that said holding means stores and holds data detected by said detection means.

53. A focus adjustment device according to claim 51, which further comprises means for focus adjustment of an optical system on the basis of data stored and held by said holding means in response to a judgment of said judgment means that said holding means does not store and hold data detected by said detection means.

54. A focus adjustment device according to claim 43, which further comprises means for focus adjustment of an optical system on the basis of the data stored and held by said holding means in response to a depression of a shutter button.

55. A focus adjustment device according to claim 43, which further comprises timer means for releasing an operation of said holding means when said remote control signal is not received for a predetermined time.

56. A focus adjustment device capable of being remote-controlled by a remote control signal, comprising:
   (A) storing means for storing data for focus adjustment in response to an operation of an operation means; and
   (B) control means for continuing the storing of the data for focus adjustment by said storing means even after the operation of said operation means is released in response to said focus adjustment device being placed into a remote controllable condition.

57. A focus adjustment device according to claim 56, wherein said data for focus adjustment stored in said storing means include distance data.

58. A focus adjustment device according to claim 56, which further comprises remote control mode setting means for setting said focus adjustment device in a remote control mode, wherein said control means acts in response to said remote control mode setting means.

59. A focus adjustment device according to claim 56, wherein said control means includes means for releasing an operation of said control means in response to a lapse of a predetermined time.

60. A focus adjustment device according to claim 56, which further comprises remote control mode setting means for setting said focus adjustment device in a remote control mode, wherein said control means acts in response to said remote control mode setting means and wherein said control means includes means for releasing an operation of said control means in response to a lapse of a predetermined time.

61. A focus adjustment device according to claim 56, wherein said control means includes means for releasing an operation of said control means in response to the focus adjustment device being taken out of a remote controllable condition.

62. A focus adjustment device according to claim 56, which further comprises mode change-over means for changing over said focus adjustment device from a remote-controlled mode to an ordinary mode, and means for releasing an operation of said control means in response to the change-over from the remote-controlled mode to the ordinary mode by said change-over means.

63. A focus adjustment device according to claim 56, wherein said control means includes means for releasing an operation of said control means in response to a mounting of a remote control signal transmitter on the focus adjustment device.

64. A focus adjustment device according to claim 56, which further comprises judgment means for judging a condition of said storing means in response to receipt of said remote control signal.

65. A focus adjustment device according to claim 64, which further comprises means for focus adjustment of an optical system on the basis of data stored in said storing means in response to a judgment of said judgment means that the storing means stores data for focus adjustment.

66. A focus adjustment device according to claim 64, which further comprises detection means for detecting data for focus adjustment and means for effecting focus adjustment of the optical system on the basis of data detected by said detection means in response to a judgment of said judgment means that said storing means does not store data for focus adjustment.

67. A focus adjustment device according to claim 56, which further comprises means for effecting focus adjustment of said optical system on the basis of data stored in said storing means when a shutter button is depressed while said control means is operating.

68. A focus adjustment device according to claim 56, wherein said control means includes means for releasing an operation of said control means if the remote control signal is not received within a predetermined time.

69. A focus adjustment device according to claim 56, which further comprises renewal means for renewing data stored in said storing means according to the control means in response to a re-operation of the operation means.

70. A focus adjustment device according to claim 56, wherein said operation means includes a shutter release button.

* * * * *

UNITED STATES PATENT AND TRADEMARK OFFICE
CERTIFICATE OF CORRECTION

PATENT NO.  : 5,093,679
DATED       : March 3, 1992
INVENTOR(S) : Hidenori Taniguchi, et al.

It is certified that error appears in the above-identified patent and that said Letters Patent is hereby corrected as shown below:

| | |
|---|---|
| Col. 1, line 50. | Change "on" to -- ON -- |
| Col. 3, line 14. | Change "An" to -- A -- |
| Col. 5, line 23. | Delete "in" |
| Col. 6, line 14. | Change "occurs" to -- occur -- |
| Col. 8, line 13. | Change "include" to -- includes -- |
| Col. 8, line 39. | After "remote-controlled" insert -- photographing -- |
| Col. 8, line 40. | After "mode" insert -- to the ordinary photographing -- |

Signed and Sealed this

Twenty-fourth Day of August, 1993

Attest:

BRUCE LEHMAN

Attesting Officer

Commissioner of Patents and Trademarks